US012293655B1

(12) United States Patent
Alali et al.

(10) Patent No.: US 12,293,655 B1
(45) Date of Patent: May 6, 2025

(54) TACTILE DIRECTIONAL GUIDE SYSTEM

(71) Applicant: Kuwait University, Safat (KW)

(72) Inventors: Khaled Ahmed Alali, Safat (KW);
Khaled Ahmed Alhazza, Safat (KW);
Bryan Lawrence Hoskins, Safat (KW)

(73) Assignee: KUWAIT UNIVERSITY, Safat (KW)

( * ) Notice: Subject to any disclaimer, the term of this patent is extended or adjusted under 35 U.S.C. 154(b) by 0 days.

(21) Appl. No.: 18/918,641

(22) Filed: Oct. 17, 2024

(51) Int. Cl.
G08B 6/00 (2006.01)
(52) U.S. Cl.
CPC ..................... G08B 6/00 (2013.01)
(58) Field of Classification Search
CPC ........................................... G08B 6/00
USPC .......................................... 340/407
See application file for complete search history.

(56) References Cited

U.S. PATENT DOCUMENTS

| | | | | |
|---|---|---|---|---|
| 6,025,773 A * | 2/2000 | Bresnan | ................ | G08B 6/00 340/407.1 |
| 10,991,216 B1 * | 4/2021 | Alali | ................ | G08B 7/066 |
| 11,626,001 B1 * | 4/2023 | Khmelev | ................ | G08B 21/12 340/532 |
| 2008/0107481 A1 * | 5/2008 | Donald | ................ | E01C 11/24 404/9 |
| 2017/0263088 A1 * | 9/2017 | Cho | ................ | G08B 7/066 |
| 2023/0055364 A1 * | 2/2023 | Lewis | ................ | G09F 19/22 |
| 2023/0414441 A1 * | 12/2023 | Paine | ................ | A61H 3/068 |
| 2024/0361845 A1 * | 10/2024 | Kienzle | ................ | G06F 3/015 |

FOREIGN PATENT DOCUMENTS

| | | |
|---|---|---|
| CN | 218768313 U | 3/2023 |
| KR | 101828239 B1 | 2/2018 |

OTHER PUBLICATIONS

Amemiya, Tomohiro, and Hisashi Sugiyama. "Design of a haptic direction indicator for visually impaired people in emergency situations." Computers Helping People with Special Needs: 11th International Conference, ICCHP 2008, Linz, Austria, Jul. 9-11, 2008. Proceedings 11. Springer Berlin Heidelberg, 2008.
Scheggi, Stefano, Agostino Talarico, and Domenico Prattichizzo. "A remote guidance system for blind and visually impaired people via vibrotactile haptic feedback." 22nd Mediterranean conference on control and automation. IEEE, 2014.

* cited by examiner

Primary Examiner — Jack K Wang
(74) Attorney, Agent, or Firm — Nath, Goldberg & Meyer; Joshua B. Goldberg

(57) ABSTRACT

The tactile directional guide system provides directional information in the form of vibrations for use during emergency evacuations and the like. The tactile directional guide system includes a vibrational module adapted for mounting on a support surface, such as the floor or wall of a hallway or corridor, as non-limiting examples. The vibrational module includes a plurality of members linearly arrayed along a longitudinal direction and a plurality of vibrators respectively coupled to the plurality of members. A controller is in communication with the plurality of vibrators and is configured to selectively sequentially actuate the plurality of vibrators in either a forward longitudinal direction or a rearward longitudinal direction to provide a tactile directional output.

7 Claims, 7 Drawing Sheets

TACTILE DIRECTIONAL GUIDE SYSTEM

BACKGROUND

Field

The disclosure of the present patent application relates to safety systems for emergency evacuations, and particularly to a tactile directional guide system.

Description of Related Art

Emergency evacuations from buildings are required in numerous situations, such as fires, floods, threats of violence, mass shootings and the like. Although corridors and hallways often include an illuminated exit sign to indicate emergency exits, such exit signs are ineffective for those with visual impairments or when there is poor visibility, such as when the corridor or hallway is filled with smoke. Sirens or other auditory alerts may also be equally ineffective, not only for those with hearing impairments, but because it is often difficult to identify the exact source of a sound, particularly in an emergency situation. Thus, a tactile directional guide system solving the aforementioned problems is desired.

SUMMARY

The tactile directional guide system provides directional information in the form of vibrations for use during emergency evacuations and the like. The tactile directional guide system includes a vibrational module adapted for mounting on a support surface, such as the floor or wall of a hallway or corridor, as non-limiting examples. The vibrational module includes a plurality of members linearly arrayed along a longitudinal direction and a plurality of vibrators respectively coupled to the plurality of members. A controller is in communication with the plurality of vibrators and is configured to selectively sequentially actuate the plurality of vibrators in either a forward longitudinal direction or a rearward longitudinal direction to provide a tactile directional output.

As a non-limiting example, when the vibrational module is mounted on, or embedded in, a floor or wall, the members may be rods or bars. As another non-limiting example, the support surface may be the surface of a handrail or the like. In this non-limiting example, the members may be rings mounted on, or embedded in, the handrail.

These and other features of the present subject matter will become readily apparent upon further review of the following specification.

BRIEF DESCRIPTION OF DRAWINGS

Similar reference characters denote corresponding features consistently throughout the attached drawings.

DETAILED DESCRIPTION

The tactile directional guide system 10 provides directional information in the form of vibrations for use during emergency evacuations and the like. The tactile directional guide system includes a vibrational module 12 adapted for mounting on a support surface, such as the floor or wall of a hallway or corridor, as non-limiting examples. In the non-limiting example of FIG. 1, the vibrational module 12 is shown mounted on the floor F of a corridor, and in the non-limiting example of FIG. 2, the vibrational module 12 is shown mounted on a wall W of the corridor. It should be understood that the vibrational module 12 may be mounted on the external surface of floor F or wall W or may be embedded therein. As an alternative to the configuration of the non-limiting example of FIG. 1, the vibrational module 12 may be covered by, or embedded in, a carpet, rug or the like. It should be understood that vibrational module 12 may be mounted on, or embedded in, any suitable type of support surface.

The vibrational module 12 includes a plurality of members 14 linearly arrayed along a longitudinal direction L. It should be understood that the relative dimensions of vibrational module 12 are shown for exemplary purposes only. Further, in the non-limiting examples of FIGS. 1 and 2, the members 14 are shown as substantially rectangular rods or bars. It should be understood that the overall shape and relative dimensions of members 14 are shown for exemplary purposes only. Further, it should be understood that the number and relative spacing of the members 14 are also shown for exemplary purposes only.

Figure 3:
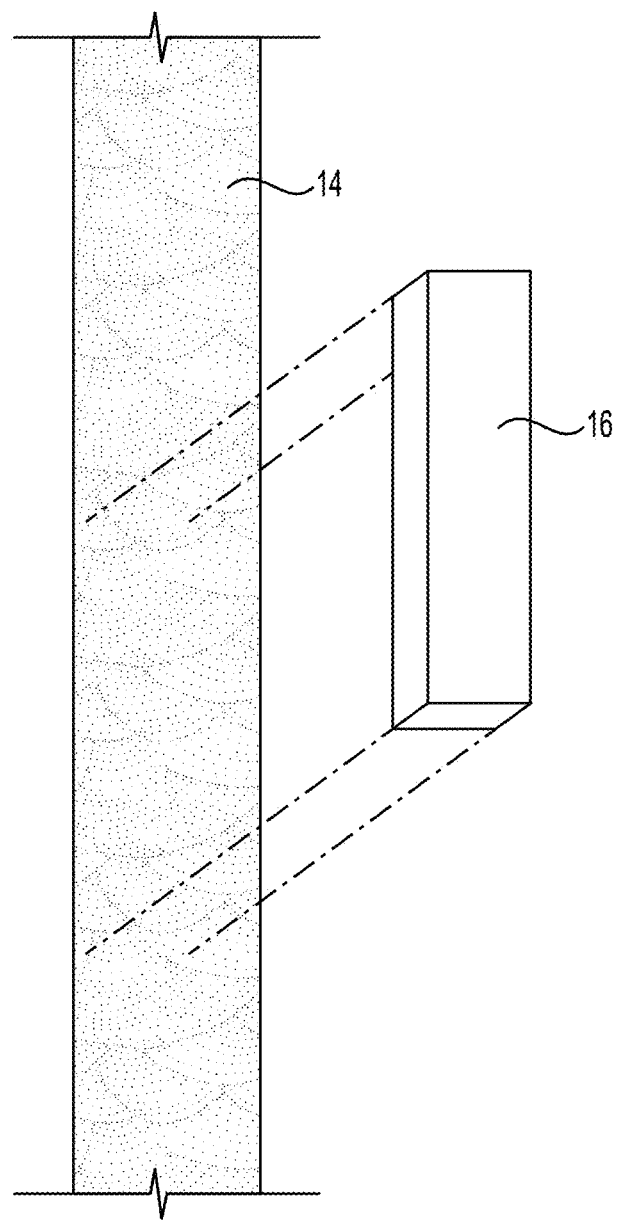
FIG. 3 is an attachment view of a member and a vibrator of the tactile directional guide system.

Each of members 14 is substantially identical. As shown in FIG. 3, each of members 14 is coupled with a corresponding vibrator 16. It should be understood that vibrator 16 may be any suitable type of selectively actuatable vibrator, vibrational actuator, haptic actuator or the like for selectively inducing vibrations in the corresponding member 14. It should be further understood that vibrators 16 may be coupled with members 14 using any suitable form of attachment, mounting or connection. Non-limiting examples of such connections include adhesives, bolts, rivets, solder and the like. Alternatively, each vibrator 16 may be either partially or fully embedded within the body of the corresponding member 14. It should be understood that the relative dimensions and overall shape of vibrator 16 are shown in FIG. 3 for exemplary purposes only.

Figure 4:
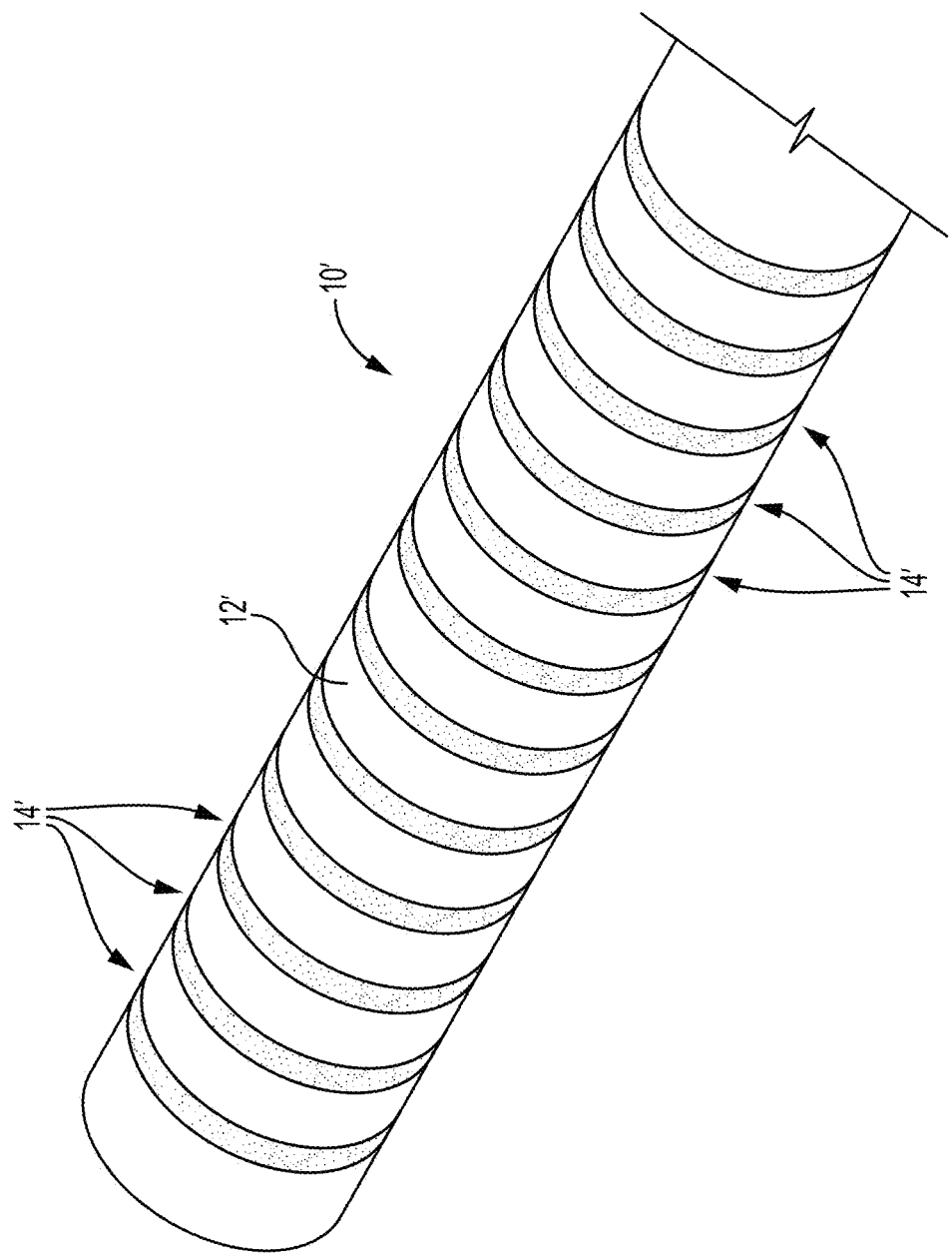
FIG. 4 is a perspective view of an alternative embodiment of the tactile directional guide system.
Figure 5:
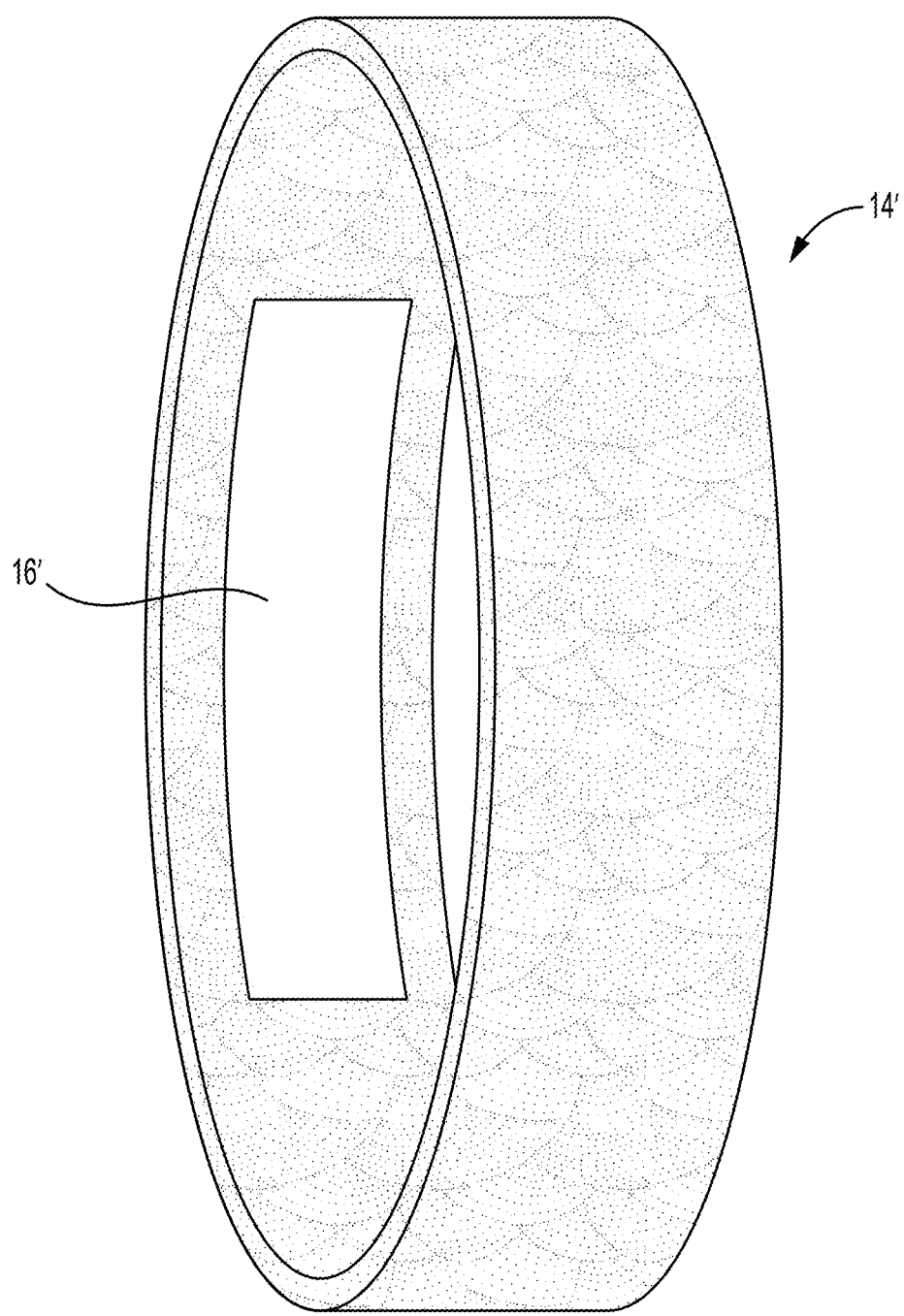
FIG. 5 is a perspective view of a member and a vibrator of the tactile directional guide system of FIG. 4.

Further, it should be understood that vibrational module 12 may include a panel, substrate or the like for the mounting of members 14 or, alternatively, the members 14 may be directly mounted on, or embedded in, the floor F, wall W or the like. In the alternative embodiment of FIG. 4, the tactile directional guide system 10' includes a plurality of ring-shaped members 14' mounted on, or embedded in, a handrail 12'. The handrail 12' may be mounted on wall W of the corridor or any other suitable support surface. As shown in FIG. 5, each ring-shaped member 14' has a vibrator 16' coupled thereto. As in the previous embodiment, each of members 14' is substantially identical. It should be understood that vibrator 16' may be any suitable type of selectively actuatable vibrator, vibrational actuator, haptic actuator or the like for selectively inducing vibrations in the corresponding member 14'. It should be further understood that vibrators 16' may be coupled with members 14' using any suitable form of attachment, mounting or connection. Non-limiting examples of such connections include adhesives, bolts, rivets, solder and the like. Alternatively, each vibrator 16' may be either partially or fully embedded within the body of the corresponding member 14'. It should be understood that the relative dimensions and overall shape of vibrator 16' are shown in FIG. 5 for exemplary purposes only.

Figure 6:
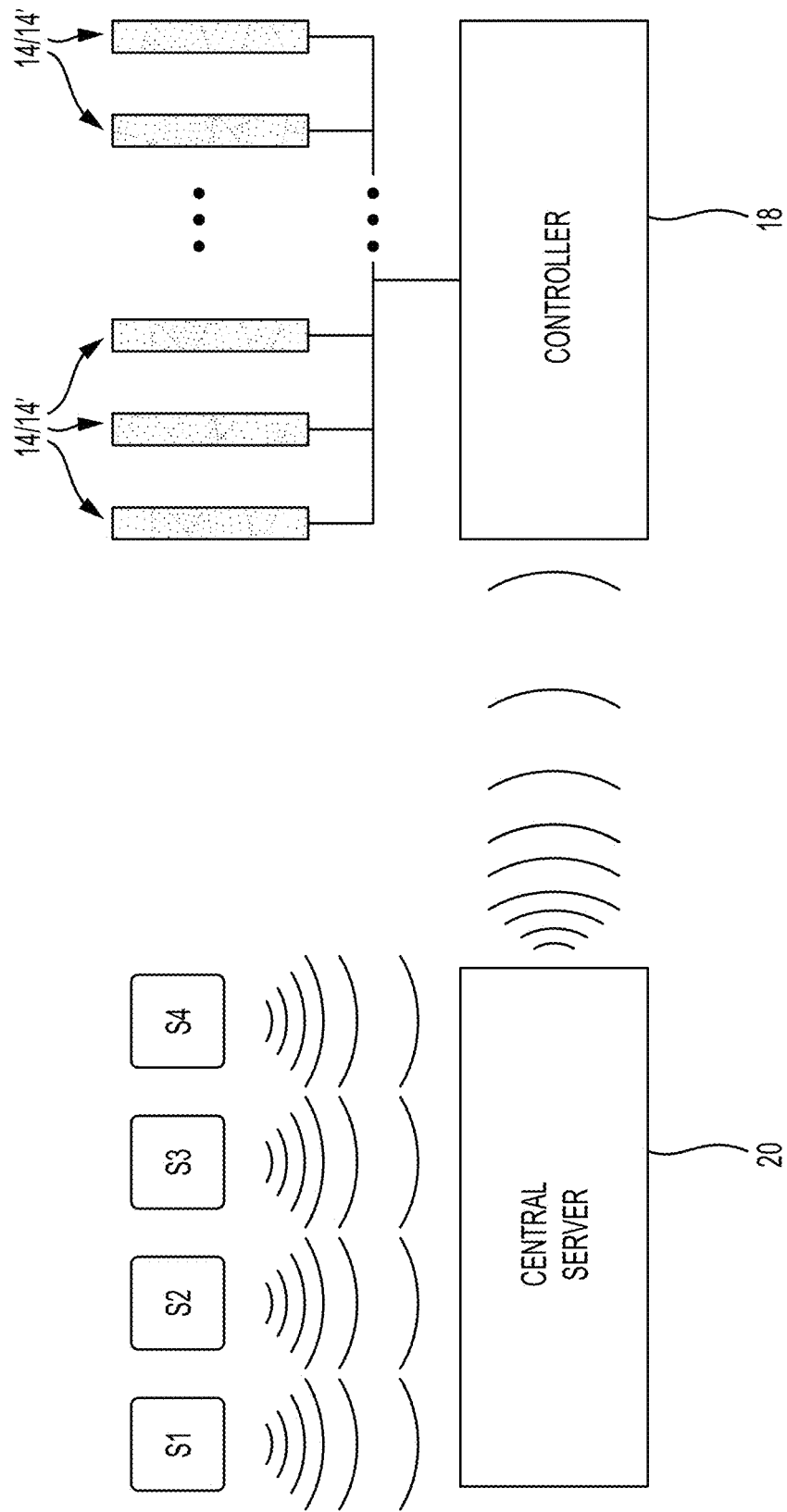
FIG. 6 diagrammatically illustrates operation of the tactile directional guide system.

As shown in FIG. 6, the members 14/14' are in communication with a local controller 18. It should be understood that controller 18 may be any suitable type of controller, such as a processor, a programmable logic controller, control circuitry or the like. When one or more sensors S1, S2, S3, S4 detects an emergency condition, the sensor(s) transmit a detection signal to a central server 20. It should be understood that although only four sensors S1, S2, S3, S4 are shown in FIG. 6, any suitable number of sensors may be deployed in the monitored environment. Sensors S1, S2, S3 and S4 may be any type of sensors for detecting an emergency condition, such as smoke sensors, carbon monoxide sensors, earthquake sensors, sound sensors or the like. Sensors S1, S2, S3 and S4 may also include various combinations of different types of sensors. Although shown in FIG. 6 as being in wireless communication with central server 20, it should be understood that sensors S1, S2, S3, S4 may also communicate with central server 20 through a wired connection. As an alternative, a manual switch may also send a detection signal to the central server 20. For example, a manual pull-down fire alarm actuator may deliver a detection signal to central server 20.

It should be understood that central server 20 may be any suitable type of computer, server, controller or the like which includes, or is in communication with, a receiver or transceiver for receiving the detection signals from sensors S1, S2, S3 and S4, and a transmitter or transceiver for delivering an actuation signal to controller 18 upon receipt of the detection signals. Although shown in FIG. 6 as being in wireless communication with controller 18, it should be understood that central server 20 may also communicate with controller 18 through a wired connection. It should be understood that controller 18 may include, or be in communication with, any suitable type of receiver or interface for receiving the actuation signal from central server 20.

The location of tactile directional guide system 10/10' with respect to the nearest emergency exits is known. This information, along with alternative pathways which may be required dependent upon detected emergency conditions, is stored in memory associated with the central server 20. Thus, when central server 20 communicates the actuation signal to controller 18, the actuation signal includes directional information to guide people to the nearest safe emergency exit. In the configuration of FIG. 6, this directional information conveyed to the people is in the form of sequential vibrations in members 14, either from the left to the right or from the right to the left. As a non-limiting example, in FIG. 1, if the nearest safe emergency exit is forward (up and to the right in the two-dimensional representation of FIG. 1), controller 18 will actuate the member 14 closest to side A of module 12. This member will then be deactuated as the nearest adjacent member 14 is actuated. The deactuation will either be immediate upon actuation of the nearest adjacent member 14 or will occur after a preset period of time. The sequential actuation and deactuation will continue until the member 14 closest to side B of module 12 is actuated. The process will then repeat. If the nearest safe emergency exit is in the opposite direction, the sequential actuation and deactuation will take place from end B to end A. People will be able to touch members 14 to feel the direction of the actuation, thus indicating the direction to take to reach the nearest safe emergency exit.

Figure 1:
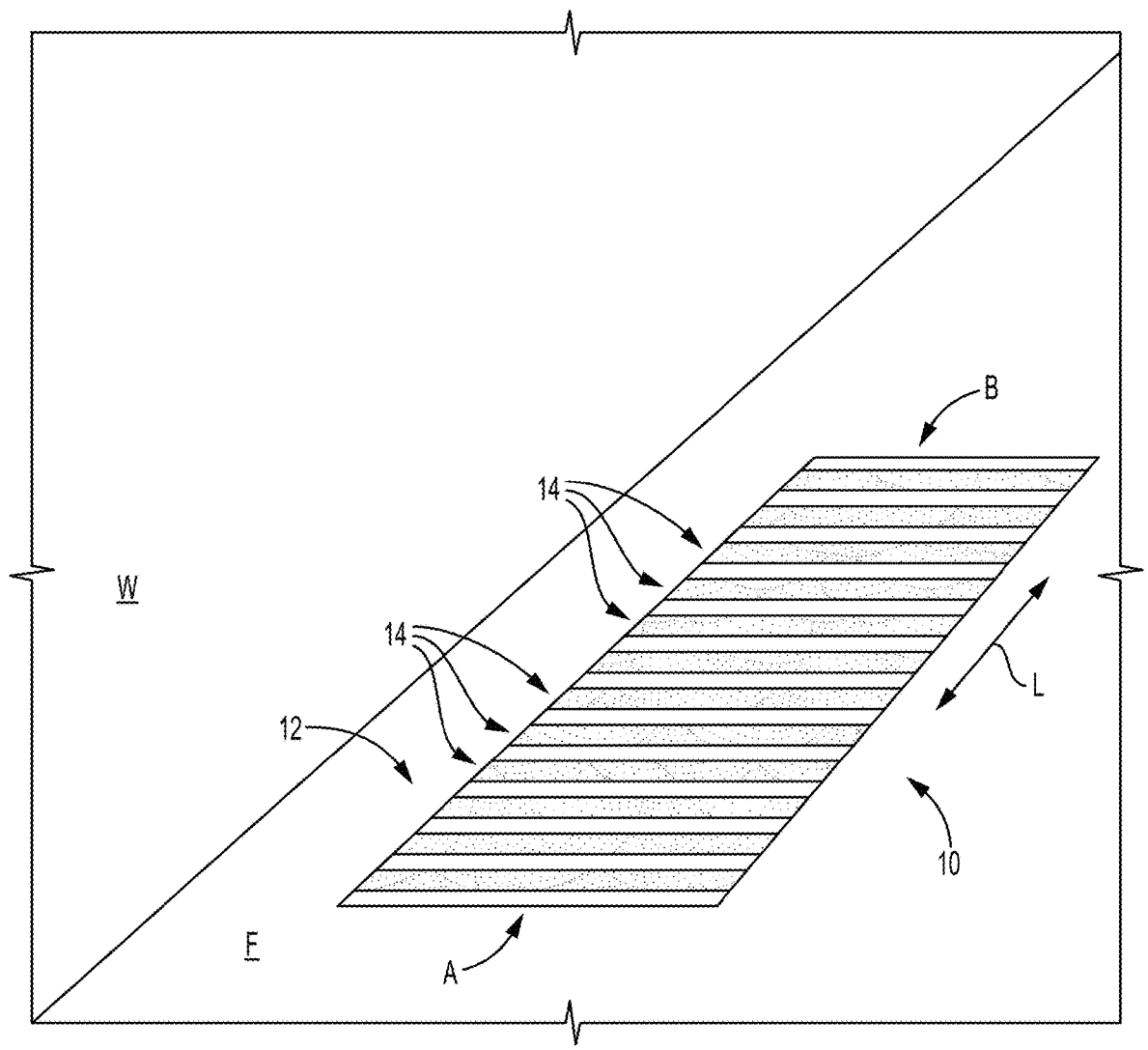
FIG. 1 is an environmental perspective view of the tactile directional guide system in a floor-mounted configuration.
Figure 2:
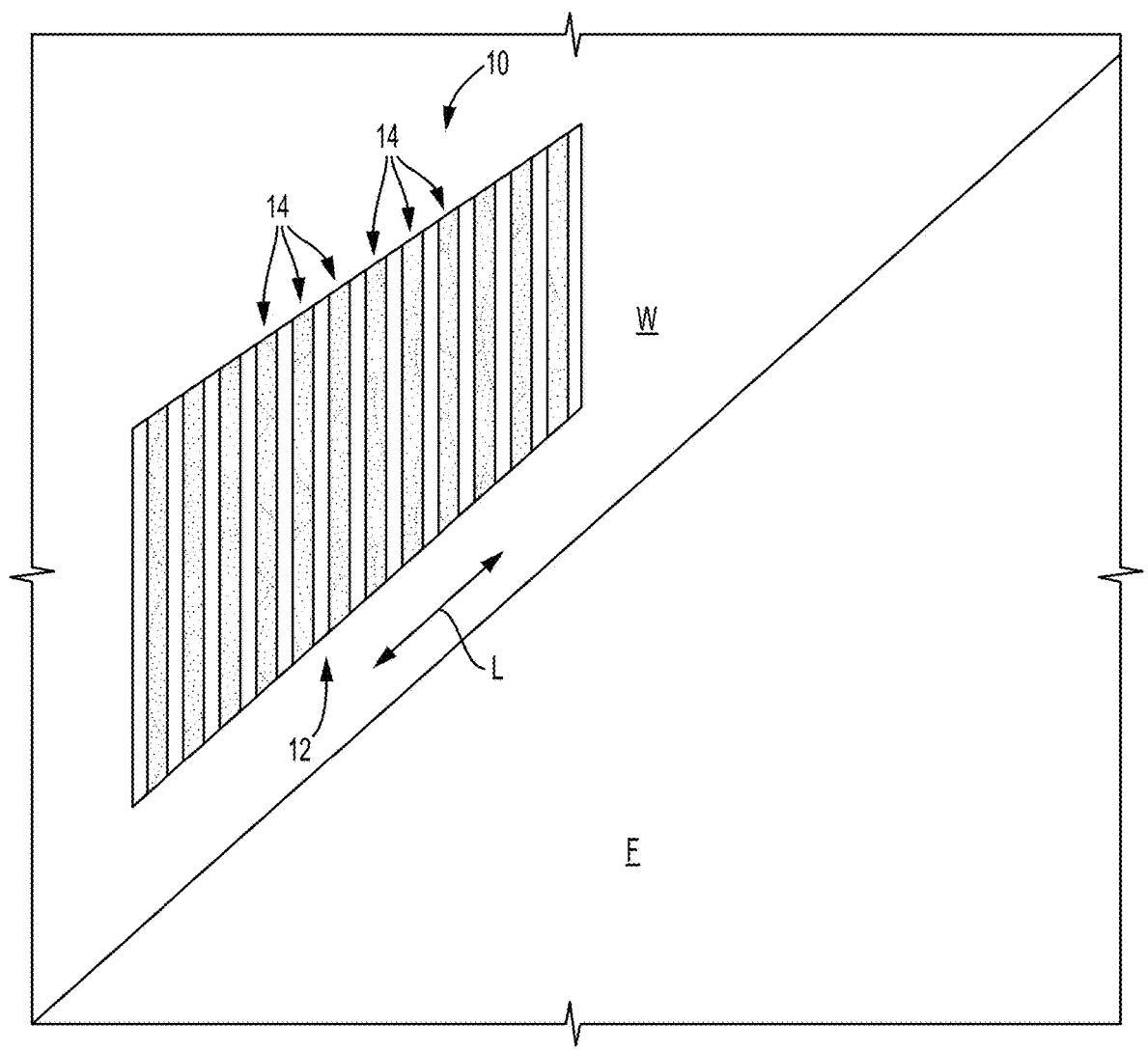
FIG. 2 is an environmental perspective view of the tactile directional guide system in a wall-mounted configuration.

Although only a single module 12 is illustrated in FIGS. 1 and 2, it should be understood that multiple modules 12, each with their own local controller 18, may be placed throughout a building or other environment, each under the control of central server 20. It should be understood that vibrators 16/16' and controller(s) 18 may be powered by any suitable source of power, such as a local rechargeable battery, individual rechargeable batteries for each vibrator 16/16', the local electrical power supply or the like.

Figure 7:
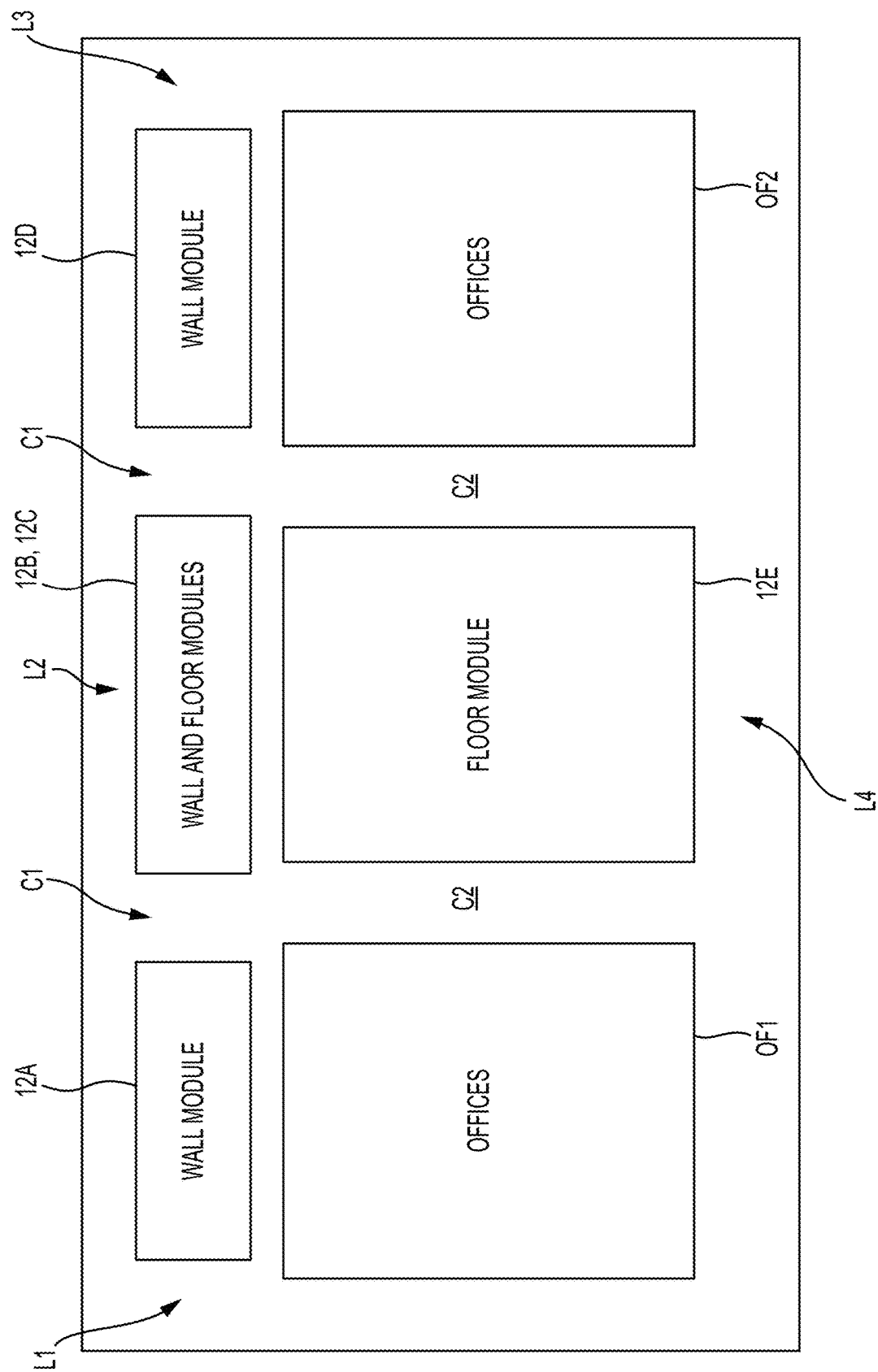
FIG. 7 schematically illustrates an exemplary floorplan including different embodiments of the tactile directional guide system working in concert with one another.

It should be understood that the above-described embodiments of the tactile directional guide system may be used in combination with one another and arranged in any desired manner. FIG. 7 schematically illustrates a non-limiting example of a floorplan using multiple tactile directional guide systems. As shown in the non-limiting example of FIG. 7, offices OF1 and OF2 are bounded on one side by a corridor C1 and a second corridor C2 is positioned between offices OF1 and OF2. In corridor C1, two wall-mounted modules 12A and 12D are positioned near locations L1 and L3, respectively, and both a wall-mounted module 12B and a floor-mounted module 12C are positioned near location L2. The wall-mounted modules 12A, 12B and 12D are similar to the module 12 shown in FIG. 2. The floor-mounted module 12D is similar to the module 12 shown in FIG. 1. It should be understood that FIG. 7 shows a non-limiting exemplary arrangement and that any desire combination of modules may be used. A second floor-mounted module 12E is located in corridor C2, between offices OF1 and OF2, and also between locations L2 and L4.

It should be understood that the corresponding members of each module may be operated in a coordinated manner with respect to one another. For example, if the direction towards a safe exit is from location L1 to location L3, passing by location L2, then the wall module 12A can be actuated such that the members of wall module 12A vibrate from left to right (in the particular orientation of FIG. 7), followed by a coordinated left-to-right actuation of the members of modules 12B and 12C, and followed by a coordinated left-to-right actuation of the members of module 12D. The reverse direction could also be used if the direction toward a safe exit is from location L3 to location L1. Alternatively, in the non-limiting example of FIG. 7, location L2 could represent a safe exit. In such a situation, module 12A could be actuated to vibrate its members in a left-to-right direction, module 12D could be actuated to vibrate its members in a right-to-left direction, and module 12E could be actuated to vibrate its members in an upward direction (in the orientation of FIG. 7). A reverse direction could be used to move people from location L2 to location L4 if the safe exit is located at location L4.

It is to be understood that the tactile directional guide system is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. A tactile directional guide system, comprising:
   a vibrational module adapted for mounting on a support surface, wherein the vibrational module comprises:

a plurality of members linearly arrayed along a longitudinal direction; and a plurality of vibrators respectively coupled to the plurality of members; and a controller in communication with the plurality of vibrators, the controller being configured to selectively sequentially actuate the plurality of vibrators in either a forward longitudinal direction or a rearward longitudinal direction to provide a tactile directional output.

2. The tactile directional guide system as recited in claim 1, wherein each of the members comprises a rod.

3. The tactile directional guide system as recited in claim 1, wherein each of the members comprises a ring.

4. The tactile directional guide system as recited in claim 3, further comprising a handrail, wherein the handrail comprises the support surface.

5. The tactile directional guide system as recited in claim 1, wherein the controller comprises a receiver for receiving actuation signals including directional information.

6. The tactile directional guide system as recited in claim 1, further comprising:

a central server for transmitting the actuation signals to the controller; and at least one sensor in communication with the central server, wherein the at least one sensor is configured to transmit a detection signal to the central server upon detection of an emergency condition.

7. The tactile directional guide system as recited in claim 1, wherein the controller is further configured to selectively sequentially actuate the plurality of vibrators in in a repeated pattern.

* * * * *

UNITED STATES PATENT AND TRADEMARK OFFICE
CERTIFICATE OF CORRECTION

PATENT NO. : 12,293,655 B1
APPLICATION NO. : 18/918641
DATED : May 6, 2025
INVENTOR(S) : Khaled Ahmed Alali, Khaled Ahmed Alhazza and Bryan Lawrence Hoskins Page 1 of 1

It is certified that error appears in the above-identified patent and that said Letters Patent is hereby corrected as shown below:

On the Title Page

Item (72) Inventors, please remove the third Inventor city "Safat, (KW)" and replace with "Stillwater, Oklahoma, (US)".

Signed and Sealed this
Twenty-fourth Day of June, 2025

Coke Morgan Stewart
*Acting Director of the United States Patent and Trademark Office*